F. H. ROYCE.
MOUNTING ENGINES OR TRANSMISSION MECHANISMS ON MOTOR VEHICLES.
APPLICATION FILED NOV. 25, 1913.

1,161,531.

Patented Nov. 23, 1915.
2 SHEETS—SHEET 1.

WITNESSES

INVENTOR
F. H. Royce.
per Percy H. Moon
Attorney.

UNITED STATES PATENT OFFICE.

FREDERICK HENRY ROYCE, OF DERBY, ENGLAND.

MOUNTING ENGINES OR TRANSMISSION MECHANISMS ON MOTOR-VEHICLES.

1,161,531.     Specification of Letters Patent.     Patented Nov. 23, 1915.

Application filed November 25, 1913. Serial No. 802,937.

*To all whom it may concern:*

Be it known that I, FREDERICK HENRY ROYCE, a subject of the King of Great Britain and Ireland, and residing at Nightingale Road, Osmaston Road, Derby, in the county of Derby, England, have invented certain new and useful Improvements in and Relating to the Mounting of Engines or Transmission Mechanisms in or on the Frames of Motor-Vehicles, of which the following is a specification.

This invention relates to the mounting of engines in or on the frames of motor vehicles and especially to that method in which the engine is carried by two pairs of bell-crank levers, one arm of each of which is pivoted to one of the side members of the frame of the vehicle and the other of which is coupled to the corresponding arm of the other bell-crank lever of the pair by a coupling link or rod, and it has for its object to counteract the effect of the reaction of the engine on the frame of the vehicle. I attain this end by the construction shown in the accompanying drawing, in which:—

Figure 1:
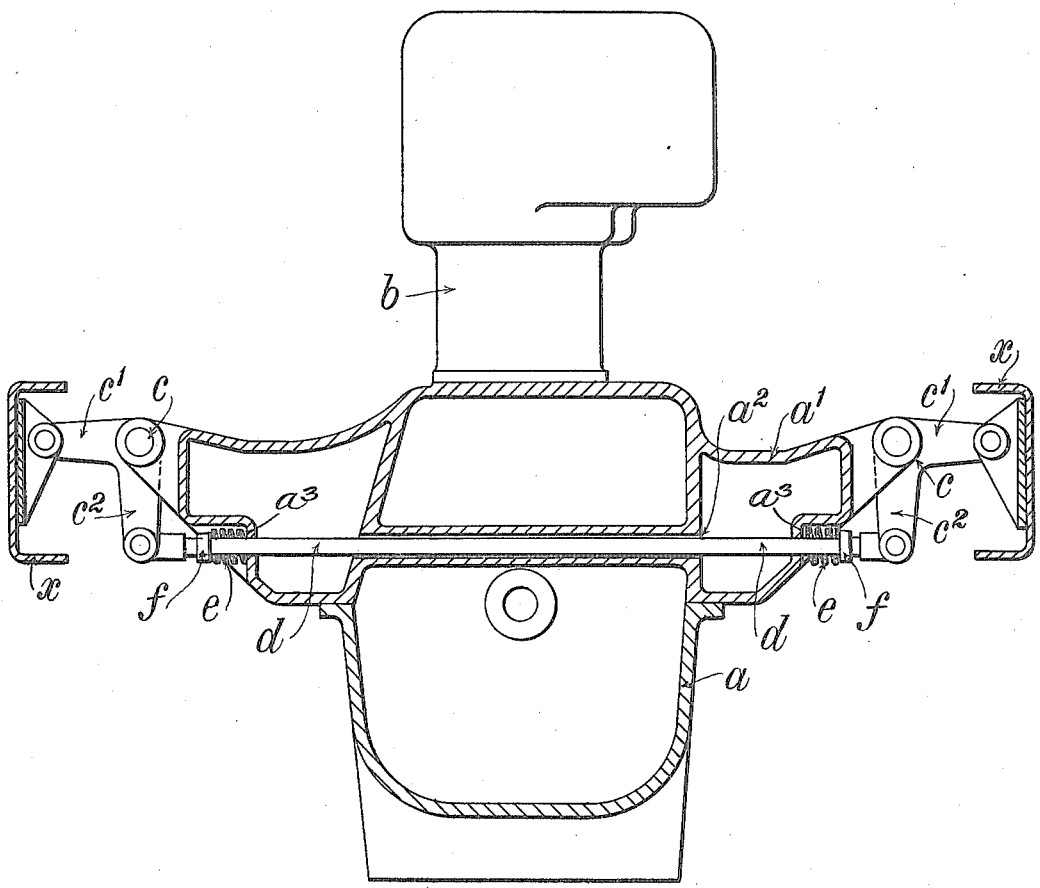
Figure 2:
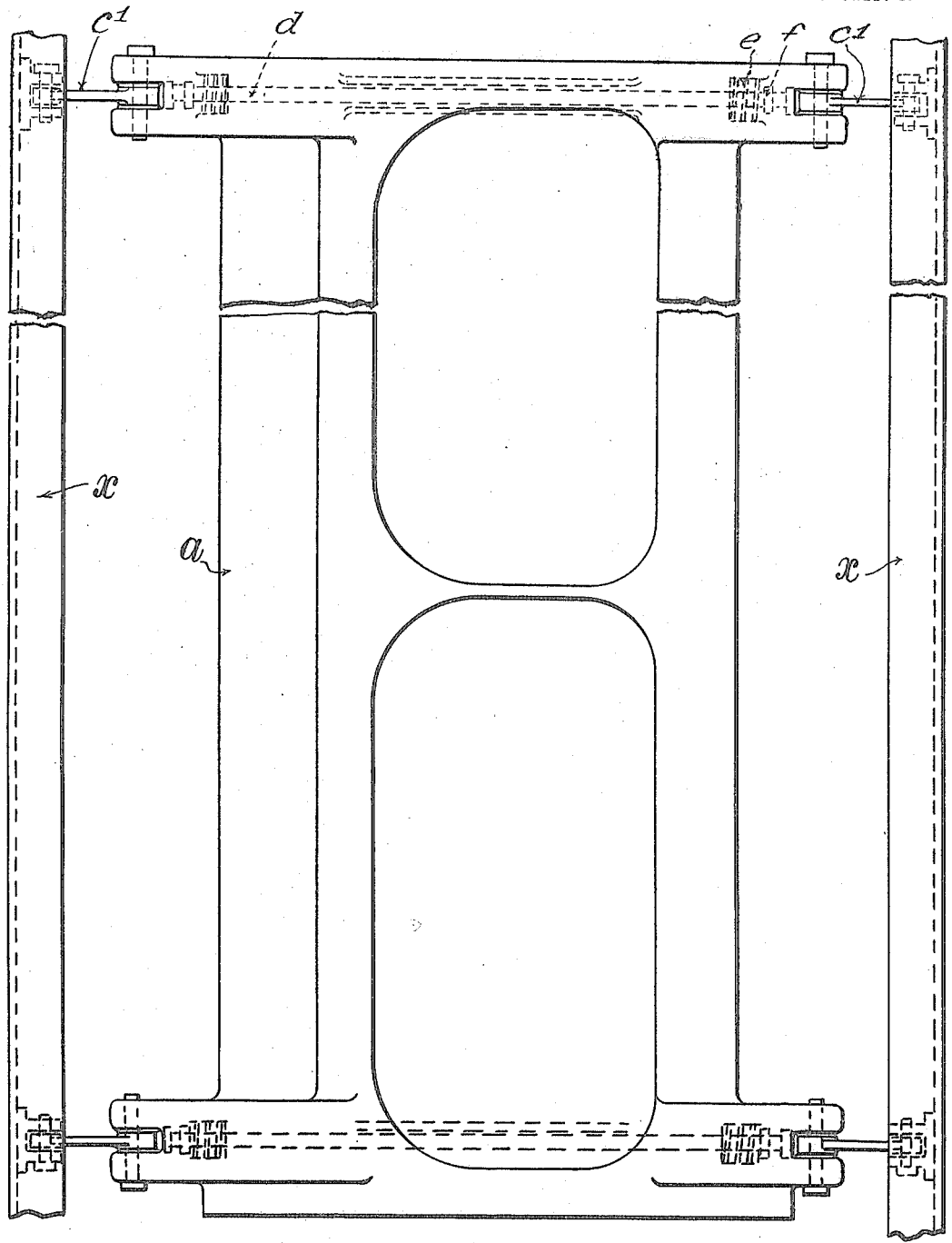

Figure 1, Sheet No. 1, is a view in elevation, partly in section, and Fig. 2, Sheet No. 2, is a view in plan.

In both views similar parts are marked with like letters of reference.

The crank-chamber $a$ of the engine—on which are mounted the cylinders $b$—is pivoted by means of four arms $a^1$ to the center parts of four bell-crank levers $c$. The free end of one arm $c^1$ of each of the levers $c$, which is horizontally arranged, is pivoted directly or indirectly to the side members $x$ of the frame, and the free ends of the other arms $c^2$ of each opposed pair of levers $c$, which are vertically arranged, are coupled together by a tie or coupling rod $d$.

The engine is kept in a vertical position by means of suitable springs $e$ each of which operates between a collar $f$ on the tie rod $d$ and the side of the crank-chamber either directly or indirectly, the preferred construction being to run the tie rods through transversely arranged holes or passages $a^2$ in the crank-chamber and provide flat surfaces $a^3$ on the brackets $a^1$ for the springs $e$ to abut against. It will be seen that this construction allows the engine free movement in a rotary direction within certain limits, the movement being resisted in both directions by the springs $e$ which are adjusted to the power of the engine. Consequently before any vibration or pressure can be imposed on the side members of the frame in a vertical direction the springs $e$ must be compressed in one direction or the other.

Although this invention has hereinbefore been described with reference to engines, it can obviously be applied to any other parts of the power or transmission mechanism.

What I claim as my invention and desire to secure by Letters Patent is:—

In a motor vehicle, four arms carried by the crank chamber of the engine, four bell-crank levers pivoted to said arms, the one arm of each lever arranged to project in a horizontal direction and pivotally connected at its extremity to one of the side members of the frame, the other arm of each lever arranged to project in a vertical direction, a coupling rod connected to the opposite vertical arms of each pair of levers passing through the crank case, and springs interposed and operating between shoulders formed on the coupling rods and seats formed on the crank chamber, as set forth.

In testimony whereof I have signed my name in the presence of two subscribing witnesses.

FREDERICK HENRY ROYCE.

Witnesses:
   C. POPPLETON,
   M. OLLEY.